United States Patent [19]
Varadi

[11] Patent Number: 5,395,517
[45] Date of Patent: Mar. 7, 1995

[54] PROCESS AND APPARATUS FOR OXIDIZING INDUSTRIAL SPENT CAUSTIC AND EFFECTING GAS-LIQUID MASS TRANSFER AND SEPARATION

[75] Inventor: Tamas Varadi, Houston, Tex.

[73] Assignee: Merichem Company, Houston, Tex.

[21] Appl. No.: 259,918

[22] Filed: Jun. 10, 1994

Related U.S. Application Data

[62] Division of Ser. No. 59,454, May 7, 1993, Pat. No. 5,354,482.

[51] Int. Cl.$^6$ .............................................. C02F 1/72
[52] U.S. Cl. .................... 210/104; 210/109; 210/149; 210/150; 210/181; 210/194; 210/221.2; 261/123; 261/147; 261/150; 55/228
[58] Field of Search ............... 210/150, 149, 188, 175, 210/181, 194, 221.2, 109, 97, 104; 261/123, 147, 150; 55/228

[56] References Cited

U.S. PATENT DOCUMENTS

| | | | |
|---|---|---|---|
| 2,560,978 | 7/1951 | Persson et al. | 210/758 |
| 2,869,844 | 1/1959 | Thomas | 261/21 |
| 3,178,260 | 4/1965 | Tirado | 210/758 |
| 3,977,829 | 8/1976 | Dardenne-Ankringa, Jr. | 210/758 |
| 3,992,156 | 11/1976 | Clonts | 23/267 |
| 4,347,226 | 8/1982 | Audeh et al. | 210/761 |
| 4,350,599 | 9/1982 | Chaudhury | 210/761 |
| 4,384,959 | 5/1983 | Bauer et al. | 210/739 |
| 4,666,689 | 5/1987 | Maple et al. | 423/183 |
| 4,675,100 | 6/1987 | Maple et al. | 208/203 |
| 4,812,243 | 3/1989 | Brandenburg et al. | 210/761 |
| 5,082,571 | 1/1992 | Beula et al. | 210/761 |

OTHER PUBLICATIONS

J. D. Martin and L. D. Levanas, "Air Oxidation of Sulfide in Process Water", *Division of Refining*, vol. 42, pp. 392–398 (1962).
F. J. Suarez, "Safe Waste Caustic Disposal", Hydrocarbon Technology International '89/'90.
M. R. Beychok, *Aqueous Wastes from Petroleum and Petrochemical Plants*, (2nd Ed. 1973 John Wiley & Sons) pp. 156–266.

*Primary Examiner*—Neil McCarthy
*Attorney, Agent, or Firm*—Jennifer S. Sickler; John R. Kirk, Jr.

[57] ABSTRACT

An improved apparatus and process for oxidizing industrial spent caustic streams, whereby oxidation of spent caustic occurs in a unitary processing tower with three chambers that cooperate simultaneously to oxidize the caustic in the first chamber; to separate the caustic from the oxidizing gas in the second chamber; and, in the third chamber, to pass gas and cooled caustic through a mass transfer apparatus that cools and cleans the gas and releases the caustic and gas into a gas-liquid separation zone of the upper chamber. An alternative embodiment of the invention involves spatially separating the upper chamber from the other two chambers.

22 Claims, 3 Drawing Sheets

PROCESS AND APPARATUS FOR OXIDIZING INDUSTRIAL SPENT CAUSTIC AND EFFECTING GAS-LIQUID MASS TRANSFER AND SEPARATION

This application is a divisional of application Ser. No. 08/059,454, filed May 7, 1993, now U.S. Pat. No. 5,354,482.

BACKGROUND OF THE INVENTION

This invention relates to the oxidation of the spent caustic occurring in the process of desalting crude oil.

Among the most common spent caustics produced by industry are those containing sodium sulfide, sodium bisulfide, sodium bicarbonate, sodium naphthenates, and sodium cresylates. If the above spent caustics are discharged directly into plant effluent waters, they place a burdensome oxygen demand on the receiving waters. Fish and other aquatic populations are adversely affected, and water may become unsafe for human consumption or it may gain a distasteful flavor. For these and other reasons, spent caustics are normally converted to a form that minimizes these problems.

Systems for oxidizing these spent caustic have been around for many years, but such systems have required complex, expensive multi-vessel facilities. For example, the Shell design described in U.S. Pat. No. 2,869,844, "Treating Liquid With Gas", Issued Jan. 20, 1959, by S. B. Thomas, incorporated by reference herein, and also described in an article by J. D. Martin and L. D. Levanas, "Air Oxidation of Sulfide In Process Water", *Division of Refining*, Vol. 42, pp. 392–98 (1962), required a feed/product exchanger for a gas/liquid mixture and three processing vessels: an oxidation column, a vessel for gas/liquid separation, and an offgas furnace. A flow diagram of the Shell process is provided in the article as FIG. 1 on page 393. A similar system is described by Milton R. Beychok in *Aqueous Wastes From Petroleum and Petrochemical Plants*, (2nd ed. 1973 John Wiley & Sons 1973) in a chapter entitled "Treatment Methods," pp. 156–266. On page 202, in particular, FIG. 30 shows a diagram of a typical oxidizing unit which is substantially the same as the Shell design. The chapter of this book entitled "Treatment Methods" is incorporated herein as if fully set out verbatim. Merlehem Company also previously designed systems requiting a feed/product heat exchanger for a gas/liquid mixture and three vessels: an oxidation tower, an offgas K.O. drum for gas/liquid separation, and an offgas treater. This is described in F. J. Suarez, "Safe Waste Caustic Disposal", *Hydrocarbon Technology International* '89/'90, which is incorporated herein by reference. The Suarez article contains two flow diagrams as FIGS. 1 and 2 that show the previous equipment and process required for oxidation of spent caustic. FIG. 1 includes a neutralization system, as well, for adjusting the pH of oxidized caustic. The offgas treater is not shown in either figure. Other oxidation processes have been developed that are even more complex. For example, in U.S. Pat. No. 4,384,959, Baurer, et al, "Wet Oxidation Process Utilizing Dilution of Oxygen", issued May 24, 1983, a method for wet oxidation of aqueous liquor containing combustible matter is described which requires a separate vessel for gas-liquid separation; a pressure control valve to reduce the pressure of cooled oxidized liquor and offgases; a feed/product exchanger; and means for injection of inert gas into the waste liquor to dilute the oxygen in the gas phase. Another example appears in U.S. Pat. No. 4,812,243, Brandenburg, et al., "Process for Treating Caustic Metal Wastes", issued Mar. 14, 1989, incorporated herein by reference, which describes a method for treating caustic cyanide and metal waste by wet air oxidation.

Thus, a system for oxidizing caustic that is simpler to build and operate, and eliminates use of a costly feed/product mixed phase exchanger to cool the oxidized caustic and gas released from the oxidation tower is needed in the industry. Furthermore, an advancement over the present technology, where caustic and hot gas would be separated before being transported from the oxidizing tower would be advantageous because it would eliminate special metallurgical and surface area requirements for downstream equipment such as an exchanger. F. J. Suarez, "Safe Waste Caustic Disposal", *Hydrocarbon Technology International* '89/'90, p. 2 of the reprinted article.

SUMMARY OF THE INVENTION

The present invention is directed to a new and improved method and apparatus for oxidizing industrial spent caustic streams, whereby oxidation of caustic occurs in a unitary processing tower with three chambers that cooperate simultaneously to oxidize the caustic in the first chamber; to separate the caustic from the oxidizing gas in the second chamber; and, in the third chamber, to pass gas and cooled caustic through a mass transfer apparatus that cools and cleans the gas and then releases the caustic and gas into a gas-liquid separation zone of the upper chamber. An alternative embodiment of the invention involves spatially separating the upper chamber from the other two chambers.

The present invention results in an efficient compact system for oxidizing industrial spent caustic. Among its many advantages, other than those mentioned above, is the use of one or two processing vessels instead of three vessels, as required by prior oxidation systems. Separate vessels are not required for gas-liquid separation and offgas cleaning. Another advantage of the present invention is the elimination of the costly mixed phase feed/product exchanger required in earlier systems. The present method, instead separates the gas and caustic in the second and third chambers prior to transporting the gas and caustic to their next destination, allowing for use of caustic/cooling water exchangers for cooling the caustic. This eliminates the surface area and special metallurgical requirements of the mixed phase feed/product exchangers. An additional advantage is the mass transfer apparatus in the third chamber that cools the gas before offloading it, and moreover, removes odorous compounds from the offgas, so that the offgas can be released to the atmosphere. This eliminates the need for a downstream offgas scrubber. Yet another advantage of the present invention is the compact unitary tower arrangement, which minimizes piping and required plot area. For all of the above reasons, less equipment is required for the method and apparatus of this invention than with methods and apparatuses known to the art. Equipment investment and costs of operation, including engineering manhours, are reduced substantially.

It is an object of the present invention to provide an improved process for oxidizing industrial spent caustic whereby the improvement comprises oxidizing spent caustic in a lower chamber of a unitary processing tower that provides an oxidation zone where the spent caustic is contacted with an oxidizing gas, preferably air. Then, the caustic and gas are communicated from the lower chamber to a middle chamber through a chimney tray defining the upper limit of the lower chamber. The gas and caustic separate by gravity in a separation zone of the middle chamber, where the caustic collects as a lower phase in the chimney tray and the gas collects as an upper phase. The collected gas is then transported through a conduit to an upper chamber. In one preferred embodiment, the upper chamber is affixed to the middle chamber. In an alternative embodiment, the upper chamber is spatially separated from the middle chamber. Meanwhile, the oxidized caustic is transported into a lower recycle conduit with means for cooling the caustic before transporting it to the upper recycle conduit, the lower chamber, or to an offloading conduit. Gas from the middle chamber and cooled caustic from the upper recycle conduit are then introduced to the upper chamber through a mass transfer apparatus that effects contact between the gas and cooled caustic and effects cleaning of the gas. The gas and caustic then separate by gravity in a separation zone of the upper chamber where caustic collects in the bottom of the chamber as a lower phase and gas collects as an upper phase. The resulting gas is then offloaded to the atmosphere or to any other desired destination. Caustic collected in the upper chamber is transported into the upper recycle conduit.

It is still another object of the present invention to provide an improved apparatus for oxidizing industrial spent caustic using gas-liquid mass transfer and gas-liquid separation, all in a unitary processing tower. The unitary processing tower comprises a lower, middle, and upper chamber, where the lower chamber provides an oxidation zone wherein the spent caustic is contacted with an oxidizing gas, preferably air. The lower chamber has means for introducing the spent caustic into the chamber adjacent to the bottom of the chamber; means for introducing the gas into the chamber to contact the caustic near the bottom of the chamber; and a chimney tray defining the upper limit of the lower chamber. The middle chamber forms a gas-liquid separation zone communicating with the lower chamber through the chimney tray, where the chimney of the tray defines a liquid collection zone in the lower part of the middle chamber with a gas phase zone above the liquid collection zone. The middle chamber also has means for removing liquid from the liquid collection zone and means for removing gas from the gas phase zone. The upper chamber comprises means for introducing the cooled oxidized caustic and the gas to the chamber, said means providing for contact between the caustic and gas to allow for cooling and cleaning of the gas; a gas-liquid separation zone; means for removing the collected caustic from the chamber; and means for removing the gas from the chamber. In one preferred embodiment, the upper chamber is affixed to the middle chamber. In an alternative embodiment, the upper chamber is spatially separated from the middle chamber.

The unitary processing tower of the present invention also includes a spent caustic conduit in communication with the lower chamber for introducing the spent caustic into the chamber for oxidation; a second caustic conduit communicating with the lower chamber for introducing cooled caustic to the chamber; a gas conduit communicating with the lower chamber to introduce the oxidizing gas into the spent caustic; a conduit connecting the means for removing the gas from the middle chamber to the means for introducing the gas to the upper chamber; a conduit in fluid communication with the liquid collection zone of the middle chamber through the means for removing liquid; a conduit communicating with the upper chamber for introducing cooled caustic into the chamber; and two recycle conduits in communication with the caustic conduits. In addition, the upper chamber includes a conduit in fluid communication with the means for removing liquid from the upper chamber, and a gas conduit in communication with the means for removing cooled, cleaned gas from the upper chamber. Further, the apparatus has means for cooling liquid in each of the recycle conduits.

In one preferred embodiment of the invention, the oxidizing zone is divided into multiple compartments, vertically superposed in the lower chamber, each forming an oxidation zone as the caustic and gas travel through each compartment. Further, the means for cooling the caustic in the two recycle conduits uses water as the cooling medium. In addition, the fiber bundle mass transfer apparatus in the upper chamber comprises a conduit extending into the upper chamber having inlets for introducing the gas and caustic and an outlet for release of the gas and caustic from the conduit, the conduit containing a plurality of fibers positioned longitudinally within the conduit making contact with the caustic collected in the upper chamber.

Still other objects, features and advantages of the present invention will be apparent from the following description of the preferred embodiments, given for the purpose of disclosure, and taken in conjunction with the accompanying drawings.

DESCRIPTION OF THE PREFERRED EMBODIMENTS

Figure 1:
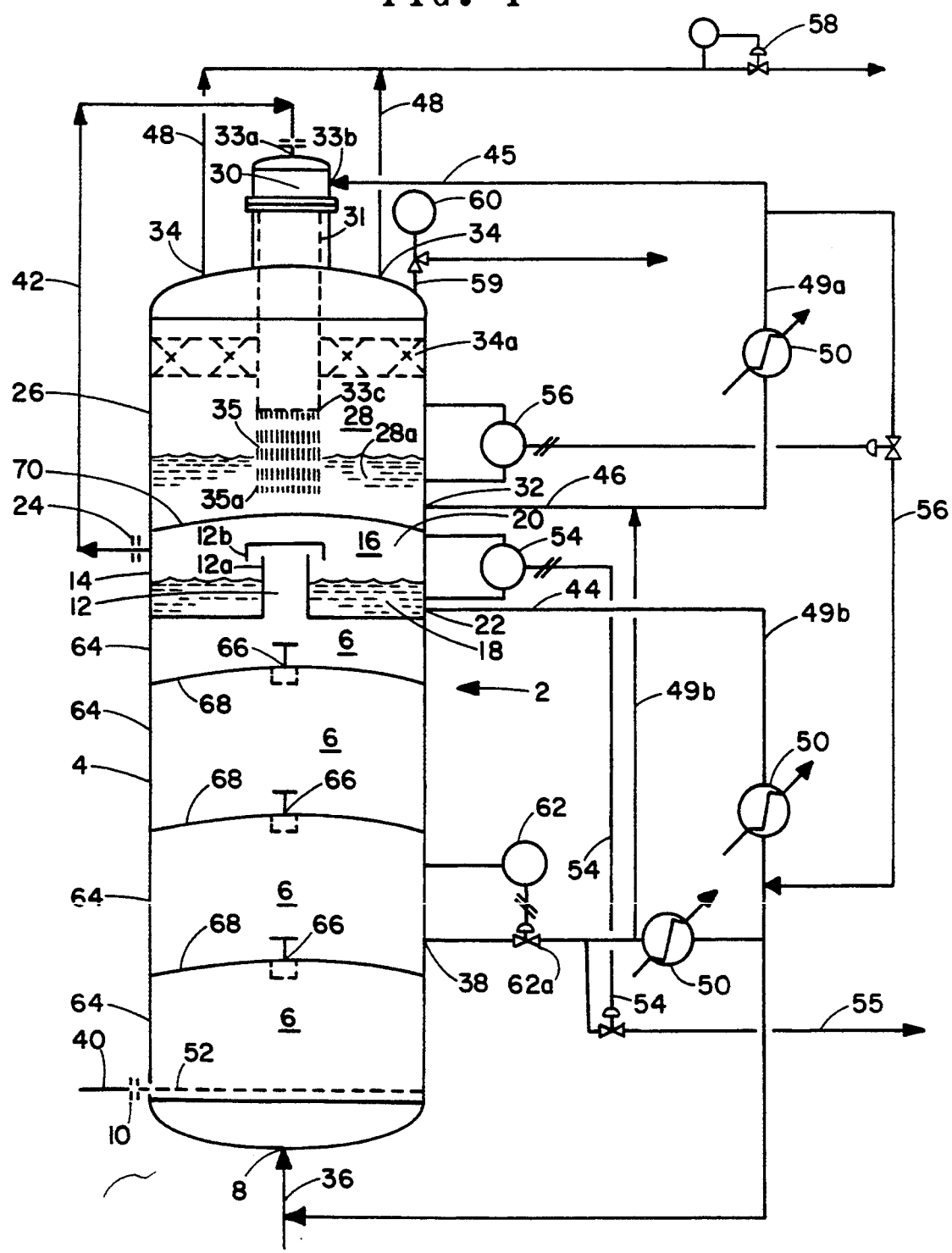
FIG. 1 is a schematic flow diagram showing the preferred embodiment of the apparatus employed in the practice of this invention.

Referring to the drawings, FIG. 1 shows a preferred embodiment utilizing a unitary processing tower 2 having a lower chamber 4 providing an oxidation zone 6 wherein the spent caustic is contacted with an oxidizing gas. The lower chamber 4 has an inlet 8 for introducing the spent caustic into the chamber adjacent to the bottom of the chamber. This inlet may be a simple port, an injector, or other means commonly known in the industry. The lower chamber 4 also has means 10, usually a sparger, for introducing the gas uniformly into the chamber to contact the caustic near the bottom of the chamber. A chimney tray 12 separates the lower chamber 4 in the preferred embodiment and middle chamber 14 housing a gas-liquid separation zone 16. The lower chamber 4 communicates with middle chamber 14 through the chimney tray 12 by way of the chimney 12a which, in conjunction with tray 12, defines a liquid collection zone 18 in middle chamber 14, with a gas phase zone 20 above the liquid collection zone 18. In an alternative embodiment of the invention, the chimney tray 12 may be replaced by a conduit communicating from the lower chamber 4 to the middle chamber 14. The middle chamber 14 also has an outlet 22 for removing caustic from the liquid collection zone 18 and an outlet 24 for removing gas from the gas phase zone 20. The outlets for removing the caustic and the gas from the middle chamber 14 may be ports or other means well known in the industry.

The unitary processing tower 2 also has an upper chamber 26 for effecting contact between the gas removed from the middle chamber 14 and a stream of cool oxidized caustic recycled from the middle 14 and upper 26 chambers. The upper chamber 26 has means 30 for introducing the cooled oxidized caustic and the gas to the chamber which provides for contact between the caustic and gas to allow for mass transfer therebetween and cleaning of the gas, removing certain contaminants and the like in the gas.

In a preferred embodiment of the invention, the means 30 for introducing the cooled oxidized caustic and gas is a mass transfer apparatus, well-known in the industry, and any such apparatus that effects intimate contact between a liquid and a gas and will fit in the tower 2 may be used. In the preferred embodiment of the invention, fiber bundle similar to those disclosed in the following two patents is used: U.S. Pat. No. 3,992,156, K. E. Clonts, "Mass Transfer Apparatus", issued Nov. 16, 1976, and U.S. Pat. No. 3,997,829, K. E. Clonts, "Liquid-Liquid Mass Transfer Apparatus", issued Aug. 31, 1976. Similar mass transfer apparatuses were also disclosed in U.S. Pat. No. 4,666,689, R. E. Maple, et al., "Process for Regenerating an Alkaline Stream Containing Mercaptan Compounds", issued May 19, 1987, and U.S. Pat. No. 4,675,100, R. E. Maple, et al., "Treatment of Sour Hydrocarbon Distillate", issued Jun. 23, 1987. All four of these patents are incorporated fully herein by reference as if set out verbatim. The mass transfer apparatus of the preferred embodiment comprises a conduit 31 extending into the upper chamber 26 having inlets 33a, 33b, for introducing the gas and caustic and an outlet 33c for release of the gas and caustic from the conduit 31. The conduit 31 contains a plurality of fibers 35 positioned longitudinally within the conduit 31 to allow a downstream end 35a of the fibers 35 to extend out of the conduit 31 making contact with oxidized caustic in a liquid collection zone 28a of the upper chamber 26.

After introduction through means 30, the gas and caustic separate in a gas-liquid separation zone 28. The upper chamber also has means 32 for removing the oxidized caustic from the chamber 26 and means 34 for removing the gas from the chamber 26. The means for removing the caustic and gas from the upper chamber 26, in one preferred embodiment, are ports, but other means well known in the industry may be used.

Various conduits communicate with the unitary processing tower 2 in the preferred embodiment. The lower chamber 4 has a spent caustic conduit 36 that introduces caustic into the chamber 4. A second caustic conduit 38 communicates with the lower chamber 4 to introduce cooled caustic to the chamber 4 in response to temperature controller 62 to maintain operating temperatures selected for the operation. This second caustic conduit 38 has a temperature control valve 62 connected therein that operates valve 62a to adjust flow of cooled caustic into the lower chamber 4 from the lower recycle conduit 49b, when gas and caustic in the lower chamber 4 reach above a specified temperature level, which is in the range of about 180° F. to about 225° F. in the preferred embodiment. A gas conduit 40 communicates with the lower chamber 4 to introduce oxidizing gas to the spent caustic through the means 10 for introducing gas to the lower chamber 4. This means 10 is connected to a flow distributor 52 positioned in the bottom of the lower chamber 4 in one preferred embodiment. The flow distributor 52 may be any number of devices commonly known in the industry, but is a perforated pipe in the preferred embodiment.

In addition, a gas conduit 42 connects the middle chamber 14 to the upper chamber 26 to transfer gas from the middle chamber 14 to the upper chamber 26. The middle chamber 14 also has a conduit 44 in fluid communication with the liquid collection zone 18 of the middle chamber 14 through the outlet 22 for removing hot liquid oxidized caustic from the middle chamber 14.

Cooled caustic is introduced to the upper chamber 26 through a conduit 45 communicating with that chamber. Further, liquid conduit 46 and gas conduit 48 transport caustic and gas, respectively, from the upper chamber 26. In one preferred embodiment this gas conduit 48 has a back pressure control valve 58 connected therein for controlling the transport of gas from the upper chamber 26. The exit means 34 for removing gas from the upper chamber 26 includes a demister pad 34a and a second conduit 59 controlled by a pressure relief valve 60 for removal of gas for safety purposes in over-pressure situations. The demister pad 34a, also known as an impingement separator, is well known in the industry and commercially available from ACS Industries Inc. and the KOCH Company. Demister pads are commonly made of stainless steel and of a thickness in the range of about 6 inches to about 2 feet. The demister pad has a thickness of about 6 inches in the preferred embodiment.

Conduits 45 and 46 are part of an upper recycle loop 49a and conduits 38 and 44 are part of a lower recycle loop 49b which circulate caustic, usually at a substantially constant flow ram, through the unitary processing tower 2. This is discussed in more detail below in connection with the preferred embodiment of the invention. The upper and lower recycle loops 49a, 49b have cooling means 50 for cooling caustic circulating through the conduits. In a preferred embodiment of the invention, this cooling means 50 is one or more caustic/cooling water exchangers. These heat exchangers, using water as the cooling medium replace prior art heat exchangers where the hot two phase stream was used as a heat exchange medium.

Of course, the construction of and interconnections between the recycle loops communicating with the unitary processing tower 2 may be varied considerably by one skilled in the art. For example, the caustic conduits 38, 44, 45 and 46 may all be connected into one recycle loop 49 with one or more caustic/cooling water exchangers 50. This embodiment of the present invention is shown in FIG. 3 and could also be built according to the embodiment shown in FIG. 2, where the upper chamber 26 is separated from the middle chamber 14. In this embodiment, the caustic/cooling water exchanger 50, if only one is used, may be a double pass exchanger.

The middle chamber 14 includes a liquid level controller 54 that regulates the release of oxidized caustic from the lower recycle loop 49 into a caustic offloading conduit 55 in response to the caustic level in the middle chamber 14. The upper chamber 26 also includes a liquid level control system 56 that allows, as approaching a control point in the chamber 26, release of cooled oxidized caustic from the upper 49a to the lower recycle conduit 49b is varied according to the nearness to the point and rate at which it changes.

Additionally, the lower chamber 4 preferably is divided into multiple compartments 64 vertically superposed in the chamber 4, each forming an oxidation zone 6. These compartments 64 have means 66 for communicating the gas and spent caustic up the unitary processing tower 2 through the compartments 64. The openings between the compartments serve also to help maintain a functioning two phase system to achieve the contact necessary to successful oxidation. Selection of the number of compartments, while purely arbitrary, may be varied depending upon the desired oxidation efficiency of the tower 2, feed rates, level of impurities and even the dimensions of the tower 2. In the embodiment illustrated, the lower chamber 4 is divided into four compartments 64. The means 66 for communicating the gas and spent caustic through the compartments 64 comprises a redistributor much like sparger 52 positioned in each partition 68 separating two compartments 64. The second caustic conduit 38 communicating with the lower chamber 4 connects thereto at the second compartment 64 from the bottom of the chamber 4.

Figure 2:
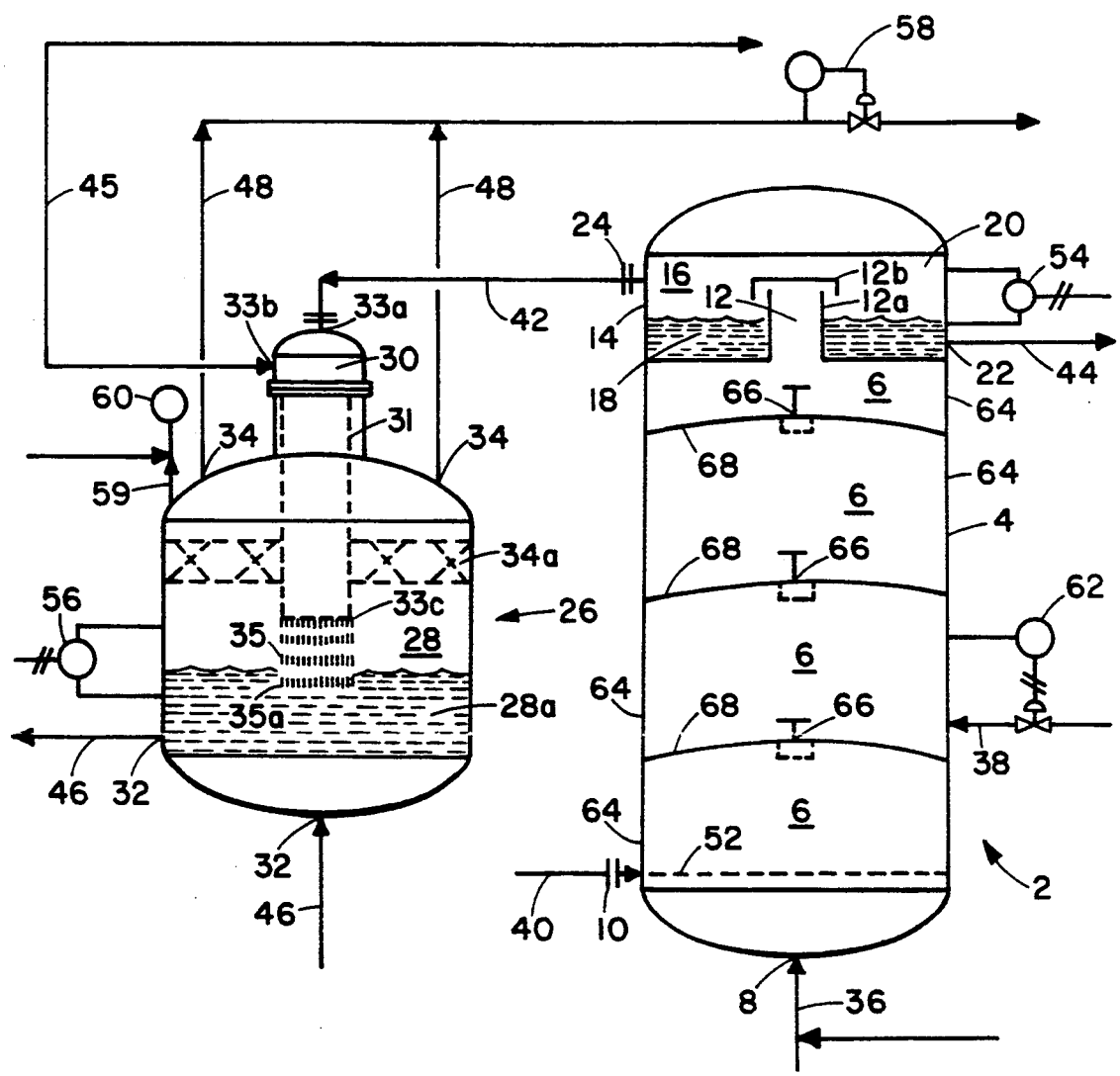
FIG. 2 is a partial schematic flow diagram of an alternative embodiment of the apparatus, wherein the upper chamber is spatially separated from the rest of the processing tower.
Figure 3:
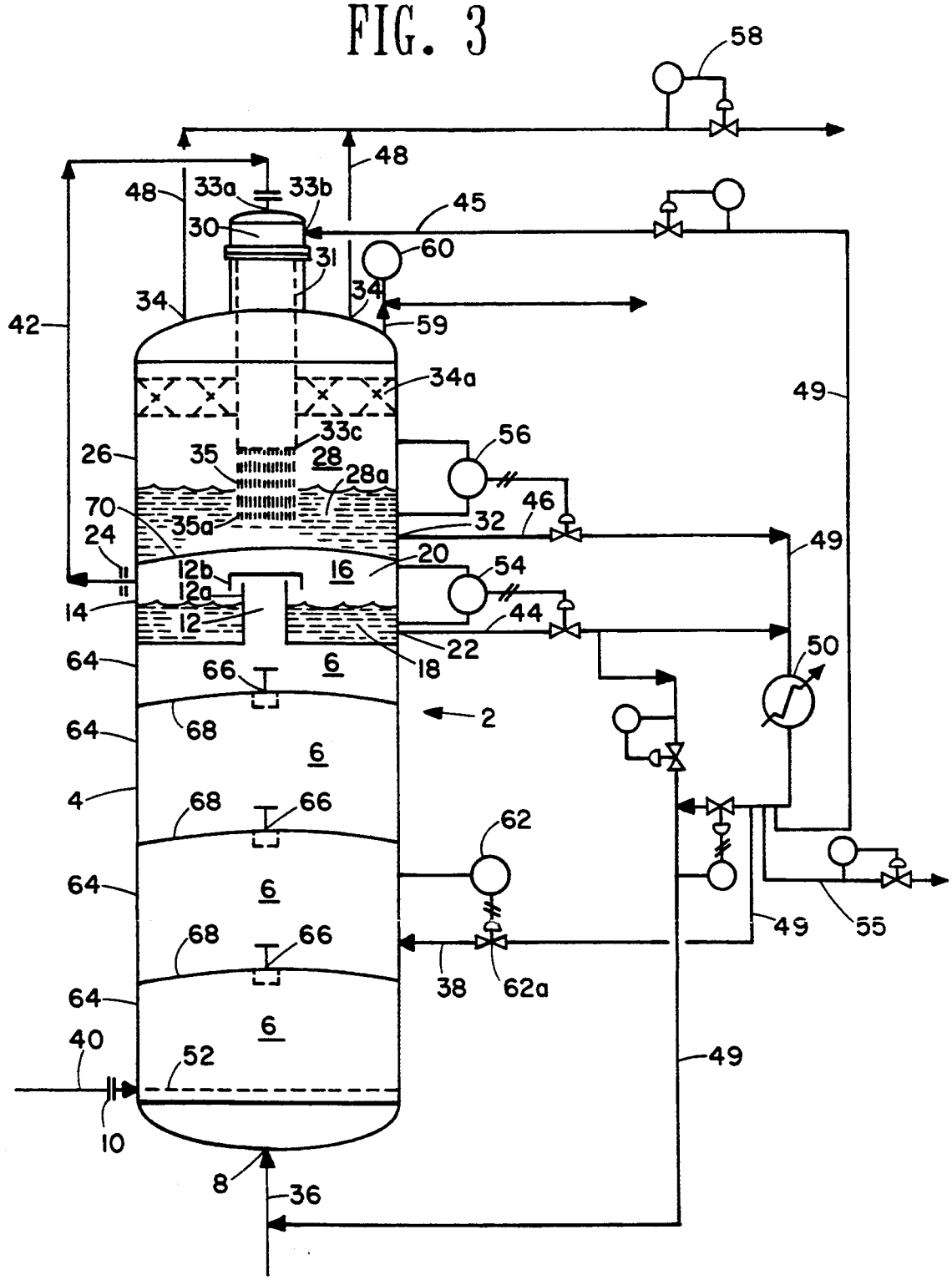
FIG. 3 is a schematic flow diagram showing an alternative preferred embodiment of the process servicing both recycle loops with a single caustic/cooling water exchanger.

An alternative embodiment of the invention, as shown in FIG. 2, comprises the same unitary processing tower 2, except that the upper chamber 26 is spatially separated from the body of the middle chamber 14. In FIG. 2, the numbered components for the alternative embodiment are the same as the components in FIG. 1 because the same equipment is used, the only difference being the separation of the upper chamber 26 from the middle chamber 14. FIG. 2, however, is a partial schematic diagram of the alternative embodiment of the apparatus to the extent that it does not show all of the conduits and the caustic/cooling water exchangers 50 shown in FIG. 1. However, those conduits and the exchangers 50 are part of the alternative embodiment. When the upper chamber 26 is separated, it may be placed above or next to the rest of the tower 2.

In the preferred embodiment, where the middle and upper chambers are not separated, the partition 70 is built thicker to accommodate the temperature differences between the middle 14 and upper 26 chambers and to accommodate the properties of the caustic and gas. Alternatively, the partition 70 may be made of a material that can withstand larger temperature differentials. The upper chamber 26, in the preferred embodiment, is at a temperature range of about 110° F. to about 120° F. in its liquid collection zone 28a. The temperature of the middle chamber 14 in the gas phase zone 20 is in the range of about 180° F. to about 225° F. However, these temperature ranges may vary greatly depending upon the size and other operating parameters of the apparatus, as will be discussed below. The unitary processing tower 2 is made of stainless steel in the preferred embodiment. However, the tower 2 may have a wide range of dimensions and may be made of any suitable material that can endure the temperature, pressure, and other operating conditions of the system, including, but not limited to, other nickel-chrome based alloys. Materials suitable for partition 70 include, but are not limited to, stainless steel or other nickel-chrome based alloys. Both materials and dimensions of the tower 2 are matters of engineering design.

The preferred method of this invention is an improved process for oxidizing industrial spent caustic in a processing tower of the type wherein an oxidation zone chamber provides contact between the spent caustic and oxidizing gas. The improvement comprises oxidizing the spent caustic in a lower chamber 4 of a unitary processing tower 2 which provides an oxidation zone 6 wherein the spent caustic is contacted with an oxidizing gas, preferably air. The spent caustic and gas are then communicated from the lower chamber 4 to a middle chamber 14 through a chimney tray 12 defining the upper limit of the lower chamber 4. Alternatively, the spent caustic and gas may be communicated to the middle chamber 14 through a conduit. The spent caustic and gas are then separated by gravity in the middle chamber 14, where the spent caustic collects in the chimney tray 12 and the gas collects above the caustic. The gas is then transported from the middle chamber 14 through a conduit 42 to an upper chamber 26. The spent caustic is transported from the middle chamber 14 into a lower recycle loop 49b with means 50 for cooling the spent caustic before it is transported to one of three destinations: the upper recycle loop 49a, the lower chamber 4, or an off-loading conduit 55.

Caustic transported to the lower chamber 4 from the lower recycle loop 49b may be mixed with the spent caustic feed stream prior to entering the chamber 4. A static inline mixer may be used for such mixing. Furthermore, if the temperature of the spent caustic entering the chamber 4 is not high enough, steam may be mixed with the caustic stream before the caustic enters the lower chamber 4 through line 36. In one preferred embodiment, a temperature control is used to monitor the temperature of the caustic feed stream after recycle caustic has been mixed into it. Then, if the feed stream temperature is too low, the temperature control system releases steam into the caustic and may also open a valve to allow bypass around the first caustic/cooling water exchanger 50 in the lower recycle loop 49b.

The gas and cooled caustic from the upper recycle loop 49a are introduced next into the upper chamber 26 through a mass transfer apparatus 30 that effects contact between the gas and cooled spent caustic and cleans the gas. The spent caustic and cooled gas are then allowed to separate by gravity in a gas liquid separation zone 16 in the upper chamber 26. The clean gas from the upper chamber 26 is transported out of the chamber to a conduit 48 for offloading, and the caustic is transported from the upper chamber 26 into the upper recycle loop 49a. The gas, however, passes through the demister pad 34a before being offloaded into gas conduit 48. Because the gas is cleaned in the mass transfer apparatus 30, it does not have to subsequently pass through an offgas treater before being offloaded.

When spent caustic and gas are introduced into the lower chamber 4, in the preferred process they make contact in the chamber adjacent to the bottom of the chamber 4. One preferred process of the invention includes the additional step of using a flow distributor 52 to mix the gas with the spent caustic in the lower chamber 4.

The step of oxidizing the caustic in the lower chamber 4 includes, in a preferred process of the invention, passing the caustic and gas through multiple compartments 64 vertically superposed in the chamber 4, each forming an oxidation zone 6. The preferred number of compartments 64 is four, but the number may be varied depending upon the desired oxidation efficiency. The gas and caustic are then passed from compartment 64 to compartment 64 through a redistributor 66 positioned in each partition 68 separating two compartments 64.

The amount of spent caustic in the middle chamber 14 may be monitored and adjusted by a liquid level control system 54. When liquid level of the middle chamber 14 changes, the liquid level control system 54 adjusts flow of caustic from the lower recycle loop 49b into an offloading conduit 55.

Communicating the gas and caustic through the mass transfer apparatus 30 preferably involves using a mass transfer apparatus 30 with a conduit 31 extending into the upper chamber 26 having inlets 33a, 33b for introducing the gas and caustic, respectively, and an outlet 33c for release of the gas and caustic from the conduit 31. This conduit 31 contains a plurality of fibers 35 positioned longitudinally within the conduit 31 making contact with collected caustic in a liquid collection zone 28a of the upper chamber 26.

A liquid level control system 56 preferably monitors the caustic level in the upper chamber 26. When a set capacity of the upper chamber 26 is reached, the control system 56 releases caustic from the upper recycle loop 49a into the lower recycle loop 49b. Gas is normally transported from the upper chamber 26 through gas conduit 48 controlled by a back pressure control valve 58. Gas may also be released from the upper chamber 26 through a second conduit 59 controlled by pressure relief valve 60 for safety purposes in over-pressure situations. A gas release through valve 60 occurs when a critical level of pressure occurs in the upper chamber 26. The critical level of pressure required in the preferred embodiment to release gas through conduit 59 is in the range of about 125 to about 150 psig. Gas is transported through a demister pad 34a in the upper chamber 26 prior to release into gas conduit 48 or the second conduit 59 for removal of gas, as discussed above.

In the preferred process, caustic in the upper and lower recycle loops 49a, b passes through caustic/cooling water exchangers 50 in communication with each conduit. The upper recycle loop 49a preferably has one caustic cooling water exchanger, while the lower recycle loop 49b has two exchangers.

Of course, caustic may be transported from chamber to chamber of the unitary processing tower 2 through a variety of interconnections between the caustic conduits communicating with the tower 2, as would be obvious to one skilled in the art. As mentioned above, the caustic conduits 38, 44, 45 and 46 may all be connected into one recycle loop 49 with one or more caustic/cooling water exchangers 50 (as shown in FIG. 3). Insofar as possible the numbering system is consistent across all three figures.

Additionally, when the gas and caustic in the lower chamber 4 reach a specified temperature, a temperature control valve 62a opens and allows more cooled caustic to flow into the chamber 4 from a second conduit 38 that is connected to the lower recycle loop 49b. The specified temperature, in the preferred embodiment, required for opening temperature control valve 62 is in the range of about 180° F. to about 225° F.

The unitary processing tower 2 of the present invention may be operated under a wide range of conditions, including temperatures ranging from about 150° F. to about 400° F. Operating pressures may range from about 30 psig to about 500 psig.

In the preferred embodiment, the spent caustic feed stream enters the lower chamber 4 at about 180° F. Steam that is at about 353° F. and about 125 psig is injected and mixed with the spent caustic feed stream prior to entering the lower chamber 4 on an as needed basis to raise the temperature of the spent caustic. Oxidizing gas, which is preferably air, is injected to the lower chamber 4 at a temperature of about 80° F. and about 100 psig. The caustic waste and gas reach a temperature of about 180° F. to about 225° F. after undergoing the exothermic oxidation reaction in the lower chamber 4. After gravity separation in the middle chamber 14, hot caustic enters the lower recycle loop 49b where some of the caustic is partially cooled by one caustic/cooling water exchanger 50 to a temperature in the range of about 180° F. to 185° F. Part of this caustic is transported back to the beginning of the process where it is mixed with the spent caustic feed stream and cycled through the tower 2 again. The rest of the caustic is passed through a second caustic/cooling water exchanger 50, where it is cooled to a temperature of about 100° F. Part of this cooled caustic is then offloaded through conduit 55 and part of it passes to the upper recycle loop 49a. Hot gas (at a temperature of about 180° F.-225° F.) is transported from the middle chamber 14 to the upper chamber 26 where it is contacted by cool caustic (at a temperature of about 100° F.) from the upper recycle loop 49a. After the caustic and gas pass through the mass transfer apparatus 30, the gas and caustic reach a temperature in the range of about 110° F. to about 120° F. Some additional operating temperatures and pressures were described previously above.

Common engineering elements such as pumps, gauges, valves, controllers and the like are not shown or described except when necessary for the understanding of the invention since for the most part selection and placement of such equipment is well within the skill of the ordinary engineer. Although the above process and apparatus are described in terms of the above preferred embodiments, those skilled in the art will recognize that changes in the process and apparatus may be made without departing from the spirit of the invention. Such changes are intended to fall within the scope of the following claims.

What is claimed is:

1. Apparatus for the oxidation of industrial spent caustic and for effecting gas-liquid mass transfer and gas-liquid separation which comprises a unitary processing tower having:
   a lower chamber providing an oxidation zone wherein the spent caustic is contacted with an oxidizing gas, said chamber having:
     an inlet adjacent to the bottom of the chamber for introducing the spent caustic to the chamber; and
     means for introducing the gas to the chamber to contact the caustic near the bottom of the chamber;
   a middle chamber forming a gas-liquid separation zone in fluid communication with the lower chamber, wherein a lower part of the middle chamber defines a liquid collection zone with a gas phase zone above the liquid collection zone, said middle chamber having an outlet for removing caustic from the liquid collection zone and an outlet for removing gas from the gas phase zone;
   an upper chamber comprising:
     inlet means for introducing cool oxidized caustic from an upper recycle conduit and gas from the middle chamber to the upper chamber, said means providing for contact between the caustic and gas to allow for cooling and cleaning of the gas;

a gas-liquid separation zone;

an outlet in the chamber for removing the caustic; and means for removing the gas from the chamber;

a caustic conduit communicating with the lower chamber for introducing spent caustic to the chamber;

a second caustic conduit communicating with the lower chamber for introducing cooled caustic to the chamber, said second caustic conduit connected to a lower recycle conduit;

a gas conduit communicating with the lower chamber to introduce the oxidizing gas into the spent caustic;

a conduit connecting the outlet for removing the gas from the middle chamber to the inlet for introducing gas to the upper chamber;

a conduit in fluid communication with the liquid collection zone of the middle chamber through the outlet for removing caustic, said conduit connected to the lower recycle conduit;

a conduit communicating with the upper chamber for introducing cooled caustic from the lower recycle conduit into the chamber, said conduit connected to the upper recycle conduit;

a conduit in fluid communication with the outlet for removing caustic from the upper chamber, said conduit connected to the upper recycle conduit;

a gas conduit in communication with the means for removing cooled, cleaned gas from the upper chamber; and means for cooling caustic in each of the caustic conduits.

2. The structure set forth in claim 1, wherein the means for introducing the gas into the lower chamber comprises an injector.

3. The structure set forth in claim 1, wherein a flow distributor is positioned in the bottom of the lower chamber, connected to the means for introducing gas into the chamber.

4. The structure set forth in claim 1, wherein the top of the lower chamber is defined by a chimney tray that allows fluid communication with the middle chamber therethrough.

5. The structure set forth in claim 4, wherein the liquid collection zone of the middle chamber is defined by the chimney of the chimney tray.

6. The structure set forth in claim 1, wherein the lower chamber is in fluid communication with the middle chamber through a conduit connecting the two chambers.

7. The structure set forth in claim 1, wherein the middle chamber includes a liquid level control system that allows release of oxidized caustic from the lower recycle conduit to an offloading conduit when the caustic capacity level of the middle chamber is reached.

8. The structure set forth in claim 1, wherein the upper chamber includes a liquid level control system that allows release of cooled oxidized caustic from the upper recycle conduit to the lower recycle conduit, when the caustic capacity level of the upper chamber is reached.

9. The structure set forth in claim 1, wherein the means for introducing the caustic and gas to the upper chamber comprises a mass transfer apparatus comprising a conduit extending into the upper chamber having inlets for introducing the gas and caustic and an outlet for release of the gas and caustic from the conduit, said conduit containing a plurality of fibers positioned longitudinally within the conduit to allow a downstream end of the fibers to extend out of the conduit making contact with regenerated caustic in a liquid collection zone of the upper chamber.

10. The structure set forth in claim 1, wherein the means for removing gas from the upper chamber includes a demister pad.

11. The structure set forth in claim 1, wherein the gas conduit in communication with the means for removing gas from the upper chamber has a back pressure control valve connected therein for controlling the transport of gas from the upper chamber.

12. The structure set forth in claim 1, wherein the means for removing the cool gas from the upper chamber includes a second conduit for removal of gas in over-pressure situations, said second conduit controlled by a pressure relief valve.

13. The structure set forth in claim 1, wherein the means for cooling caustic in each of the recycle conduits is a caustic/cooling water exchanger in fluid communication with each recycle conduit.

14. The structure set forth in claim 1, wherein the second caustic conduit communicating with the lower chamber has a temperature control valve connected therein that allows release of cooled caustic into the lower chamber when gas and caustic in the lower chamber reach a specified temperature level, said second caustic conduit connected to the lower recycle conduit.

15. The structure set forth in claim 1, wherein lower chamber is divided into multiple compartments vertically superposed in the chamber, each forming an oxidation zone, said compartments having means for communicating the gas and spent caustic upwardly through the compartments.

16. The structure set forth in claim 15, wherein the lower chamber is divided into four compartments.

17. The structure set forth in claim 15, wherein the means for communicating the gas and spent caustic through the compartments comprises a redistributor positioned in a partition separating adjacent compartments.

18. The structure set forth in claim 15, wherein the second caustic conduit communicating with the lower chamber connects thereto at the second compartment from the bottom of the chamber.

19. The structure set forth in claim 1, wherein the upper chamber is spatially separated from the middle chamber.

20. Apparatus for the oxidation of industrial spent caustic and for effecting gas-liquid mass transfer and gas-liquid separation which comprises a unitary processing tower having:

a lower chamber divided into four compartments vertically superposed in the chamber wherein oxidizing gas and spent caustic are mixed and communicated through the compartments using a redistributor positioned in a partition separating adjacent compartments, each compartment forming an oxidation zone, said chamber further having:

an inlet adjacent to the bottom of the chamber for introducing spent caustic to the chamber;

an injector for introducing the gas into the chamber near the bottom of the chamber, said injector connected to a flow distributor positioned in the bottom of the chamber; and a chimney tray defining the upper limit of the lower chamber;

a middle chamber forming a gas-liquid separation zone communicating with the lower chamber through the chimney tray, wherein the chimney of the chimney tray defines a liquid collection zone in the lower part of the middle chamber with a gas phase zone above the liquid collection zone, said middle chamber having an outlet for removing caustic from the liquid collection zone; and an outlet for removing gas from the gas phase zone;

an upper chamber comprising:

means for introducing to the upper chamber cooled oxidized caustic from an upper recycle conduit and gas from the middle chamber, said means comprising a mass transfer apparatus having a conduit extending into the upper chamber with inlets for introducing the gas and caustic and an outlet for the release of the gas and caustic from the conduit, said conduit containing a plurality of fibers positioned longitudinally within the conduit to allow a downstream end of the fibers to extend out of the conduit making contact with oxidized caustic in a liquid collection zone of the upper chamber;

a gas-liquid separation zone;

an outlet in the chamber for removing the oxidized caustic; and means for removing the gas from the chamber, wherein a gas conduit in communication with the means for removing gas from the upper chamber has a back pressure control valve connected therein for controlling the transport of gas from the upper chamber, said means for removing gas also including a demister pad and a second conduit for removal of gas in over-pressure situations that is controlled by a pressure relief valve;

a spent caustic conduit communicating with the lower chamber for introducing spent caustic into the chamber;

a second spent caustic conduit communicating with the lower chamber for introducing cooled oxidized caustic to the chamber, connected thereto at a second compartment from the bottom of the chamber, having a temperature control valve connected therein that allows release of the cooling caustic into the lower chamber from a lower recycle conduit when gas and,caustic in the lower chamber reach a specified temperature level;

a gas conduit communicating with the lower chamber to introduce the oxidizing gas into the spent caustic;

a conduit connecting the outlet for removing the gas from the middle chamber to the inlet for introducing gas to the upper chamber;

a conduit in fluid communication with the liquid collection zone of the middle chamber through the outlet for removing liquids, said conduit connected to the lower recycle conduit;

a liquid level control system connected to the middle chamber that releases oxidized caustic from the lower recycle conduit to an offloading conduit when the caustic capacity level of the middle chamber is reached;

a conduit communicating with the upper chamber; for introducing cooled caustic from the lower recycle conduit into the chamber, said conduit connected to the upper recycle conduit;

a conduit in fluid communication with the outlet for removing liquid from the upper chamber, said conduit connected to the upper recycle conduit;

a liquid level control system connected to the upper chamber that allows release of cooled oxidized caustic from the upper recycle conduit into the lower recycle conduit;

a gas conduit in communication with the means for removing cooled, clean gas from the upper chamber; and caustic/cooling water exchangers in fluid communication with each of the recycle conduits.

21. The apparatus set forth in claim 20, wherein the upper chamber is spatially separated from the middle chamber.

22. Apparatus for the oxidation of industrial spent caustic and for effecting gas-liquid mass transfer and gas-liquid separation which comprises a unitary processing tower having:

a lower chamber providing an oxidation zone wherein the spent caustic is contacted with an oxidizing gas, said chamber having:

an inlet adjacent to the bottom of the chamber for introducing the spent caustic to the chamber; and means for introducing the gas to the chamber to contact the caustic near the bottom of the chamber;

a middle chamber forming a gas-liquid separation zone in fluid communication with the lower chamber, wherein the lower part of the middle chamber defines a liquid collection zone with a gas phase zone above the liquid collection zone, said middle chamber having an outlet for removing caustic from the liquid collection zone and an outlet for removing gas from the gas phase zone; and an upper chamber comprising:

means for introducing oxidized caustic and gas from the middle chamber to the upper chamber, wherein said caustic has been cooled by means for cooling caustic after transport from the middle chamber, said means for introducing providing for contact between the caustic and gas to allow for cooling and cleaning of the gas;

a gas-liquid separation zone;

an outlet in the chamber for removing the caustic; and means for removing the gas from the chamber.

* * * * *